United States Patent
Palasz et al.

(10) Patent No.: US 9,670,295 B2
(45) Date of Patent: Jun. 6, 2017

(54) BLOCK-COPOLYMER CONTAINING CROSSLINKABLE PHOTOINITATOR GROUPS

(71) Applicants: Henkel AG & Co. KGaA, Duesseldorf (DE); Evonik Rohm GmbH, Darmstadt (DE)

(72) Inventors: Peter D. Palasz, Old Taplow (GB); Maria Xenidou, Duesseldorf (DE); Kerstin van Wijk, Duesseldorf (DE); Simon Krause, Aschaffenburg (DE); Stefan Hilf, Dietzenbach (DE)

(73) Assignees: Henkel AG & Co. KGaA, Duesseldorf (DE); Evonik Röhm GmbH, Darmstadt (DE)

( * ) Notice: Subject to any disclaimer, the term of this patent is extended or adjusted under 35 U.S.C. 154(b) by 555 days.

(21) Appl. No.: 13/796,771

(22) Filed: Mar. 12, 2013

(65) Prior Publication Data

US 2013/0197156 A1      Aug. 1, 2013

Related U.S. Application Data

(63) Continuation of application No. PCT/EP2012/053831, filed on Mar. 7, 2013.

(30) Foreign Application Priority Data

Mar. 18, 2011   (EP) .................................... 11158823

(51) Int. Cl.
| | | |
|---|---|---|
| C09J 153/00 | (2006.01) | |
| C08F 22/10 | (2006.01) | |
| C08F 293/00 | (2006.01) | |
| C09J 7/02 | (2006.01) | |
| C09J 133/08 | (2006.01) | |

(52) U.S. Cl.
CPC .......... *C08F 22/10* (2013.01); *C08F 293/005* (2013.01); *C09J 7/0221* (2013.01); *C09J 133/08* (2013.01); *C09J 153/00* (2013.01); *C08F 2438/01* (2013.01); *C09J 2201/606* (2013.01)

(58) Field of Classification Search
CPC ..... C08F 293/005; C08F 22/10; C09J 7/0221; C09J 133/08; C09J 153/00
See application file for complete search history.

(56) References Cited

U.S. PATENT DOCUMENTS

| | | |
|---|---|---|
| 3,214,492 A | 10/1965 | Tacker |
| 4,148,987 A | 4/1979 | Winey |
| 6,806,320 B2 | 10/2004 | Everaerts et al. |
| 7,064,151 B1 | 6/2006 | Berge et al. |
| 7,307,115 B2 | 12/2007 | Husemann et al. |
| 7,745,505 B2 | 6/2010 | Liu et al. |
| 7,829,606 B2 | 11/2010 | Lu et al. |
| 8,034,879 B2 | 10/2011 | Balk et al. |
| 2003/0114582 A1* | 6/2003 | Husemann ........ C08F 293/005 524/558 |
| 2004/0260030 A1* | 12/2004 | Husemann ........ C08F 293/005 525/302 |
| 2005/0187346 A1 | 8/2005 | Husemann et al. |
| 2011/0014404 A1 | 1/2011 | Beyers et al. |

FOREIGN PATENT DOCUMENTS

| | | |
|---|---|---|
| EP | 1268591 | 1/2003 |
| EP | 1300427 | 4/2003 |
| EP | 1595930 | 11/2005 |
| EP | 2181131 | 5/2010 |
| JP | 2004026911 A | 1/2004 |
| JP | 2004505166 A | 2/2004 |
| JP | 2006506505 A | 2/2006 |

OTHER PUBLICATIONS

International Search Report issued in connection with international Patent Application No. PCT/EP2012/053831 mailed Mar. 30, 2012.
Czech. Z., Martysz D., "UV-crosslinkable solvent-based pressure-sensitive adhesives with very low shrinkage", Int. Journal of Adh. and Adhesives, vol. 24, No. 6, pp. 533-534 (2004).
DIN EN ISO 11357-3.

* cited by examiner

*Primary Examiner* — Peter D Mulcahy
(74) *Attorney, Agent, or Firm* — James E. Piotrowski

(57) ABSTRACT

A block-copolymer containing at least two different blocks wherein block A contains (meth)acrylate monomers the copolymer having a glass transition temperature of less than 15° C., block B contains (meth)acrylate monomers the copolymer having a glass transition temperature of more than 25° C. being free of thio-containing substances in the polymer chain, characterized in that one block contains at least one photoinitiator chemically bound to the chain.

20 Claims, No Drawings

BLOCK-COPOLYMER CONTAINING CROSSLINKABLE PHOTOINITATOR GROUPS

The invention is directed to acrylic block copolymers containing photoinitator groups such polymers being cross-linkable by radiation. The invention further includes pressure sensitive adhesives comprising such cross-linkable block copolymers.

Block copolymers based on acrylic monomers and other copolymerizable monomers are disclosed in EP 1268591. The products disclosed have a variety of block copolymer architectures, which in one block may contain, inter alia, allyl methacrylate, as a reactive unit. The predominant fraction of the architectures presented, however, comprises AB diblock copolymers featuring a sharply differing solubility of the two blocks in the solvent surrounding the materials. The gelled polymers as disclosed herein are not useful for polymers and adhesives which shall be applied in a liquid or molten state.

EP 2181 131 discloses pentablock copolymers which shall contain OH— groups. Such polymers can be cross-linked by other components reactive with such OH— groups. No polymers are disclosed which contain internal cross-linking groups.

EP 1300427 discloses copolymers of acrylic monomers, which contain photoinitiator groups in the polymer chain. As statistically polymerization processes are used such groups are distributed along the chain. No block copolymers of a specific structure are disclosed.

EP 1595930 discloses block copolymers of acrylic monomers, which contain photoinitiator groups in the polymer chain. The polymer chain contains thioether segments. Thio-ether or thioesters are strongly smelling substances which should not remain in the end product. Additionally the polymers disclosed are manufactured by known free radical polymerization. The polymers disclosed are of comb or star like structure.

U.S. Pat. No. 7,829,606 discloses radiation curable hot melt adhesives which contain an acrylic polymer and a long chain acrylate monomer. No acrylic block copolymers are disclosed.

Block copolymers are used inter alia for adhesives. In such case it is useful to apply the adhesive in a liquid or molten form. The use of solvents to dissolve the polymer is known but to form a solid layer requires the evaporation of solvents which is detrimental under environmental aspects. Liquid non reactive polymers in many cases do not fulfill the requirements with respect to cohesion and adhesive strength as the backbone of the polymer is too short. It is known to increase the molecular weight by cross-linking, and this can be reached by the addition of cross-linking substances. But this requires a proper mixing and reaction of the components that no unreacted groups are present, so that the polymer does not change its properties during storage. Additionally it is known, that statistically cross-linked polymers are limited in its properties. Such polymers are difficult to get modified in its properties by the polymer chain, so the properties have to be improved by additives contained in the adhesive.

It is the object of the present invention to provide block copolymers which are highly viscous or can be molten at low temperatures. Such block copolymer shall incorporate functional groups capable of being cross-linked by radiation in at least one block. The block copolymer itself shall show an elastic behaviour at ambient temperature which shall be retained after cross-linking. The copolymers shall not contain thio-substances which may migrate or evaporate from the adhesive.

Another object is to provide a pressure sensitive adhesive which can be applied in a liquid or molten form and which after being cross-linked by radiation provides a pressure sensitive adhesive layer. Another object of this invention is to provide a tape which is coated with a layer of a pressure sensitive adhesive which has been cross-linked by radiation.

The object is solved by a block-copolymer containing at least two different blocks wherein block A contains (meth) acrylate monomers the copolymer having a glass transition temperature of less than 15° C., block B contains (meth) acrylate monomers the copolymer having a glass transition temperature of more than 25° C., which is free from thio-compounds in the polymer chain characterized in that one block contains at least one photoinitiator chemically bound to the chain.

The block-copolymer according to the invention is manufactured from (meth)acrylate monomers. Such monomers are known and also their properties. They can be selected in a way that as copolymer they show different glass transition temperatures (Tg, measured by DSC, DIN ISO 1 1357). According to the invention the polymer shall contain at least two blocks of different composition which have a different Tg. This can be achieved by the monomer selection of the different blocks. Such selection can be made by a man skilled in the art according to its knowledge. The polymer can be prepared by different radical polymerization methods. In a preferred embodiment the block copolymers can be manufactured by ATRP.

Monomers which are polymerized both in block A and in block B are selected from the group of (meth)acrylates such as, for example, alkyl (meth)acrylates of straight-chain, branched or cycloaliphatic alcohols having 1-40 carbon atoms, such as, for example, methyl (meth)acrylate, ethyl (meth)acrylate, n-butyl (meth)-acrylate, isobutyl (meth) acrylate, tert-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth) acrylate; aryl (meth)acrylates such as, for example, benzyl (meth)acrylate or phenyl (meth)acrylate which may in each case have unsubstituted or mono- to tetra-substituted aryl radicals; other aromatically substituted (meth)acrylates such as, for example, naphthyl (meth)acrylate; mono(meth)acrylates of ethers, polyethylene glycols, polypropylene glycols or mixtures thereof having 5-80 carbon atoms, such as, for example, tetrahydrofurfuryl methacrylate, methoxy(m) ethoxyethyl methacrylate, 1-butoxypropyl methacrylate, cyclo-hexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate and poly(propylene glycol) methyl ether (meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as a-methylstyrene and a-ethylstyrene, substituted styrenes with one or more alkyl substituents on the ring such as vinyltoluene and p-methylstyrene, halogenated styrenes such as for example, monochlorostyrenes, dichloro-styrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, 9-vinylcarbazole, 3-vinylcarbazole, 4-vinylcarbazole, 2-methyl-1-vinylimidazole, vinyloxolan, vinylfuran, vinylthiophene, vinylthiolane, vinyl-thiazoles, vinyloxazoles and isoprenyl ethers; maleic acid derivatives, such as, for example, maleic anhydride, maleimide, methylmaleimide and dienes such as divinylbenzene, for example, and also the respective hydroxy-functionalized and/or amino-functionalized and/or mercapto-functionalized compounds. Furthermore, these copolymers may also be prepared such that they have a hydroxyl and/or amino and/or mercapto functionality in one substituent. Examples of such monomers include vinylpiperidine, 1-vinylimidazole, N-vinylpyrrolidone, 2-vinylpyrrolidone, N-vinylpyrrolidine, 3-vinylpyrrolidine, N-vinyl-caprolactam, N-vinylbutyrolactam, hydrogenated vinyl-thiazoles and hydrogenated vinyloxazoles.

The copolymer may contain additionally other functional groups, like allyl, epoxy groups, which can be incorporated as functional monomer during polymerisation. Or other groups can be present like COOH or OH which can be prepared by a subsequent reaction after polymerization. It is possible to incorporate such functional groups in both blocks or in one block only.

Additionally according to the invention one type of the blocks has incorporated chemically bound monomers which contain as additional functional group a photoinitiator group. The monomers may be statistically distributed in the block. But it is also possible to incorporate the photoinitiator monomers at the start or at the end of a block adjacent to the following block.

Preferably the photoinitiator (PI) shall be bound by radical polymerization in the polymer chain. For such purpose the photoinitiator shall contain one acrylate or methacrylate or another unsaturated group and a UV-active group. The UV-active groups are known in principle as Norrish Type I or Type II cleavers. Such groups may have the structure for example as aromatic ketones like benzophenone, acetophenone, benzyl, benzoin, hydroxyalkylphenone, phenyl cyclohexyl ketone, anthraquinone, thioxanthone, triazine, or fluorenone derivatives.

Such polymerisable photoinitiator can be selected for example from acetophenon or benzophenon derivatives which contain a (meth)acryl group or a phenyl-(2-propene) group. The polymerisable unsaturated double bond can be bound directly to the acetophenon or benzophenon group, preferably both groups are separated by a spacer. Such spacer shall have a molecular weight up to 500 g/mol, preferably up to 300 g/mol. Such spacer may comprise carboxylic groups, ester groups, polyether groups or polyurethane groups. Examples of such photoinitiator monomers are disclosed in U.S. Pat. No. 7,745,505, U.S. Pat. No. 4,148,987 or U.S. Pat. No. 3,214,492. Such photoinitiators are commercially available.

The amount of such PI-monomer is selected that at least about one photoinitiator group is bound in a block, preferably 1 to 10 photoinitiator groups per polymer chain. In a preferred embodiment of the invention the photoinitiators are bound in block A, in a different embodiment the photoinitiator is bound in block B.

The polymer shall comprise at least two blocks AB, but the invention shall also include other structures, e.g. ABC, ABA, BAB, (AB)nA or (AB)nZ wherein n has the values from 2 to 10; Z is a multifunctional central group; C is a block of different composition. Preferred structures are AB, ABA, (AB)nA, n is 2 to 4. The blocks shall show a different glass transition temperature which is achieved by the selection of the monomer composition. Block A shall have a Tg of less than 15° C., preferably less than 0° C., block B shall have a Tg of more than 25° C., preferably more than 50° C. The Tg can be measured by DSC of a copolymer having the same monomer composition as the respective block. Preferably B comprises styrene and/or methylmethacrylate monomers. Preferably A comprises at least alkyl acrylate monomers having an alkyl group from C4 to C12.

The molecular weight of the block copolymer shall be from 20000 to 300000 g/mol (MN, number average molecular weight, to be determined by GPC against PMMA standard). The molecular weight distribution can be selected by the polymerization parameters. It shall comprise the range of 1.3 to 6.0 preferably more than 1.5, most preferred more than 3.0.

In addition to the chemical composition of the blocks in a preferred embodiment block(s) B shall comprise 2 to 30 wt-% of the block copolymer and block(s) A from 98 to 70 wt-%, in a further embodiment block(s) B shall comprise 30 to 75 wt-% of the block copolymer.

The block copolymers according to the invention may be prepared by means of sequential polymerization preferably by ATRP. The process can be carried out in any desired halogen-free solvents. Preference is given to toluene, xylene, water; acetates, preferably butyl acetate, ethyl acetate, propyl acetate; ketones, preferably ethyl methyl ketone, acetone; ethers; aliphatics, preferably pentane, hexane, biodiesel, but also plasticizers such as low-molecular-mass polypropylene glycols or phthalates. As bifunctional initiators useful for ATRP halogen containing substances are known, e.g. CI, BR or I containing esters, ketones and/or phenyl derivatives can be used. Thio-containing substances to start or transfer the polymerization shall be avoided. Specifically the resulting copolymer is free from sulfur containing compounds. The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 40° C. to 120° C. Besides solution polymerization the ATRP can also be carried out as emulsion, miniemulsion, microemulsion, suspension or bulk polymerization. The parameters and the process to manufacture such block copolymers by ATRP are generally known. After the polymerization the polymer can be further processed, for example it is possible to prepare solvent free copolymers.

Another object of the invention is a pressure sensitive adhesive (PSA) which incorporates the above mentioned block copolymers which adhesive is cross-linkable by radiation. Such PSA may include in addition to the copolymer other ingredients or additives which can be added in order to achieve the required performance properties such as, for example, cohesive strength, viscosity, softening point or stability. These adhesives may include plasticizers, stabilizers, antioxidants for improving the ageing behavior of the adhesive, pigments or fillers, rosins to increase the tack, radiation reactive diluents or solvents. In one embodiment the invention includes the acrylic block copolymer as hot melt adhesive, in a different embodiment the adhesive is a solvent borne adhesive.

The plasticizer is preferably used for viscosity adjustment and is comprised in the hot melt pressure sensitive adhesive according to the invention in a concentration of generally 0 to 25% by weight, preferably 0 or up to 15% by weight. Suitable plasticizers include medicinal white oils, naphthenic mineral oils, phthalates, adipates, polypropylene, polybutene, polyisoprene oligomers, hydrogenated polyisoprene and/or polybutadiene oligomers, liquid polyesters, benzoate esters, vegetable or animal oils and derivatives thereof. Hydrogenated plasticizers are selected from the group of paraffinic hydrocarbon oils, polyisobutylenes, naphthenic oils, medicinic white oils; other suitable plasticizers are monohydric or polyhydric alcohols with a molecular weight of 1000 to 6000 g/mol, and glycerol esters, preferably plasticizers based on hydrocarbon compounds and oils are selected. Such plasticizers are selected so that they are fully compatible with the adhesive.

The stabilizers, more particularly UV stabilizers, or antioxidants suitable for use as additives in accordance with the present invention include phosphites, phenols, sterically hindered phenols of high molecular weight, polyfunctional phenols, sulfur- and phosphorus-containing phenols. Suitable compounds in the context of the invention are, for example, hydroquinone, hydroquinone methyl ether or phenothiazine. They are added to the hot melt PSA in quantities of typically about 0.1 to 3.0% by weight. The choice and the properties are known to the person skilled in the art.

The adhesive composition may additionally comprise natural or synthetic resins. The natural resins may be of vegetable or of animal origin. Examples of resins include shellac and colophony, gum resins or wood resins. Not only the native natural resins, but also their derivatives are usable, whether these be obtained by disproportionation, dimerisation, hydrogenation, polymerisation, esterification, salt formation or by addition of unsaturated compounds, for example, of maleic acid. The synthetic resins are generally obtained by polymerisation or polycondensation. They have normally a molecular weight of less than 1500 g/mol. Examples or synthetic resins include hydrocarbon, terpene, coumarone/indene, furan, alkyd, aldehyde, ketone, phenol, glycerol ester, polyester, epoxy, urea, melamine, polyamide and isocyanate resins. Preferably hydrocarbon, terpene, coumarone/indene, furan, aldehyde and ketone resins are preferred. The amount added is about 0 to 50 wt-% of the total adhesive composition, preferably 5 to 40 wt-%.

The PSA adhesive may additionally contain 0 to 5% by weight of at least one photoinitiator and/or photosensitizer. Basically, any commercially available photoinitiators that are compatible, i.e., form at least substantially homogeneous mixtures, with the PSA may be used for the purposes of the invention. The photoinitiators are substances or mixtures of substances which are stable in the absence of light and, on exposure to radiation, absorb so much energy that they initiate radical or ionic polymerizations.

Waxes in quantities of 0 to 20% by weight may optionally be added to the PSA. The quantity is limited so that, on the one hand, viscosity is reduced to the required range and, on the other hand, adhesion is not adversely affected. The wax may be of natural or synthetic origin. Suitable natural waxes are vegetable waxes, animal waxes, mineral waxes or petrochemical waxes. A preferred embodiment does not contain any wax.

For special purposes dyes, pigment or fillers can be incorporated in the adhesive. However, in this case it must be ensured that this additive does not inhibit a penetration of the radiation into the adhesive and the polymerisation reaction.

In a different embodiment the copolymer is dissolved in organic solvents. A single solvent can be used or a mixture. Preferably such solvent are suitable which are listed above as useful for the polymerization process. Most preferably the solvents shall have a boiling point of less than 130° C. and they may evaporate from the adhesive layer. The amount of solvent is in the range of 10 to 50 wt-% of the adhesive. The additives useful for this embodiment are the same as listed above.

In a specific embodiment the hot melt adhesive shall consist 50 to 100 wt-% of at least one block copolymer according to the invention and 50 to 0 wt-% of additives. Preferably 0.1 to 3 wt-% of antioxidants and/or 5 to 50 wt-% of at least one tackifier are contained. In case that the block-copolymer contains more than 20 wt-% of block B it is preferred that the adhesive precursor contains at least one plasticizer in an amount of up to 25 wt-%. Another preferred form does not include any additional photoinitiator not bound to the polymer.

Another embodiment the adhesive shall consist of 50 to 90 wt-% of at least one block copolymer, and 0 to 50 wt-% of additives and 10 to 50 wt-% of solvents. Preferably 0, 1 to 3 wt-% of antioxidants and/or 5 to 40 wt-% of at least one tackifier are contained, most preferably the solvent is selected from esters, ketones and/or alcohols having a boiling point of less than 130° C.

The adhesive according to the invention can be manufactured by known processes. The block copolymer(s) can be mixed and blended with the other desired additives such as functional monomer, tackifier, and antioxidant, this can be supported by heating and melting the viscous or solid compounds. The mixing operation shall be performed until a clear mixture is formed. Entrapped air may be removed by application of a vacuum. Any radiation shall be avoided which may crosslink the reactive adhesive. Such processes are known in the art.

The hot melt adhesive according to the invention shall have a suitably low viscosity before exposure to radiation. At 130° C., the viscosity is usually in the range 10000 mPas to 450000 mPas (Brookfield viscometer, spindle 27, EN ISO 2555), preferably from 20000 to 100000 mPas. The PSA can be stored in the absence of radiation. The embodiment as solvent borne PSA shall have a viscosity of 200 to 5000 mPas measured at 25° C.

Another object of the invention is a flexible flat substrate which is coated with a layer of the PSA. The layer is cross-linked by radiation. The hot melt pressure sensitive adhesives according to the invention have the low viscosity at low processing temperatures. The adhesive can be applied in a molten form to a substrate. The substrates can be selected for example from polymeric films, non wovens, release liner or fabrics, but preferably polymeric film substrates are used, e.g. as label or as tape. The substrate material is typically a thermoplastic polymeric sheet material as single layer or as multilayer substrate. Additionally other layers can be incorporated, also the substrate may be printed. As examples for substrates films made of a thermoplastic polyester or polyolefin can be used. At least on one side of the substrate a coating consisting of the PSA according to the invention is applied and subsequently this layer is cross-linked by radiation, e.g. by EB or UV radiation. Such radiation emitting sources are known, for example as continuous lamp, as flashlight, as UV-emitting LED or as EB source.

The layer of the adhesive is applied in an amount from about 5 to 300 g/m$^2$. It shows a tacky surface after curing.

It can be stapled or rolled against an uncoated surface of the substrate or it is possible to apply a release sheet on the surface.

As preferred embodiment according to the invention permanent tacky adhesive films or tapes can be manufactured. A further embodiment of the present invention is the use for manufacturing self-adhesive labels. In this case such labels are coated with an inventive adhesive and cross-linked by radiation. The resulting self-adhesive surfaces can be covered with an anti-adhesively coated release film. So self-adhesive labels are obtainable.

The block copolymers according to the invention show improved melting characteristics, a low melting temperature and a low viscosity. They are free from any thio-compound. They can be cross-linked by radiation and no additional low molecular weight cross-linker is required. Such copolymers can be used as hot melt adhesives, which may comprise additionally other auxiliaries to improve specific properties of the adhesive. Such hot melt adhesives can be applied to polymeric film substrates. Such hot melt adhesive is cross-linkable and can be formulated in a way not to contain low molecular weight compounds which can migrate out of the adhesive. Useful fields of application are films, tapes or labels coated with a layer of the PSA according to the invention.

The adhesive used as solvent borne adhesive can be applied with known means for example rollers, blades, nozzles, in a spraying process or in a print process. Specifically thin layers of an adhesive can be applied. After application the solvent will evaporate, such process can be accelerated by heating or by blowing a gas across the surface. After the layer has been formed the adhesive can be crosslinked as written above.

The examples given below are given for the purpose of improved illustration of the present invention, but shall not restrict the invention to the features disclosed herein.

Example 1

Polymer 1, Polymerisation of Polymers 2-4 were Carried Out with the Same Procedure In a 5 L glass reactor equipped with a mechanical stirrer, a nitrogen inlet and a pressure valve were added 450 g acetone, the monomer mixture (EHA 400 g, tBA 49 g, PI 8.9 g, BA 400 g, MA 150 g), 4.5 g PMDETA and 1.8 g cuprous oxide. The mixture was degassed by addition of dry ice and repeated pump-flush cycles with nitrogen. To the degassed mixture was given 2.4 g Ethyl-(2-bromo-2-methyl propionate) and stirred at 60° C. for 14 h before 7MMA (75 g), and Acetone (320 g) were added in one shot to the mixture and stirred for another 5 h. The Polymerization was then quenched by allowing air to penetrate into the solution and cooling to room temperature. The residual catalyst complex was removed in a first step by stirring over highly active bleaching earth (20 g, Tonsil) and filtering over a depth filter Seitz K700. Residual copper was removed by adding acetic acid (4.5 g) and Zinc powder (1.8 g) to the solution, stirring for 15 Minutes and filtering of the remaining Zinc over depth filter K700.

Example 2 (Stripping)

The polymer solutions 1-4 were extruded under reduced pressure a pre-heated extruder (ZSK 30, housing temperature 300° C.) in order to remove the remaining solvent and to cleave the containing tertbutyl esters to give the free acid containing polymer as an almost colourless to slightly brownish tacky solid.

Composition

| Example: | | Polymer 1 | Polymer 2 | Polymer 3 | Polymer 4 |
|---|---|---|---|---|---|
| Monomer 1A | EHA | 400 g | 400 g | 380 g | 360 g |
| Monomer 2A | tBA | 49 g | 49 g | 95 g | 140 g |
| Monomer 3A | PI | 8.9 g | 8.9 g | 8.7 g | 8.5 g |
| Monomer 4A | BA | 400 g | 400 g | 380 g | 360 g |
| Monomer 5A | MA | 150 g | 150 g | 140 g | 130 g |
| Initiator | PMDETA | 2.4 g | 2.4 g | 2.4 g | 2.4 g |
| Monomer 5B | MMA | 75 g | 100 g | 75 g | 75 g |
| MN (1 stage) | | ca. 77000 | ca. 74000 | ca 67000 | ca 78000 |
| MN (end product) | | 80000 | 80000 | 85000 | 90000 |
| D | | 1.6 | 1.6 | 3.6 | 4.0 |

MA = Methylacrylate;
BA = n-Butylacrylate,
tBA = tert, Butylacrylate,
EHA = 2-Ethylhexylacrylate,
PI = Benzophenon-acrylate,
MMA = Methylmethacrylate
PMDETA = N,N,N',N',N''-pentamethyldiethylenetriamine The copolymers were blended at about 150° C. with a hydrocarbon tackifier (Foral 85) in a ratio 90:10 or 95:5. A clear adhesive was obtained, which can be applied at about 130° C. The adhesives were applied in an amount of 50 g/m$^2$ at a temperature of 130° C. to a silicon liner. The polymer film was then subjected to irradiation 90 mJ/cm$^2$ UVC, the cured film was transferred to a PET film (50 pm). Thereafter a film was obtained having a tacky surface at 25° C. The film was stored for 24 h.

The samples were tested for Shear strength, Peel adhesion and Shear adhesion Failure Temperature (SAFT).

The polymer 3 was dissolved in 40 wt-% ethylacetate. The solution was applied to a silicon paper, the solvent evaporates and the adhesive layer was subjected to UV as described above. The adhesive was transferred to a PET film (50 g/m$^2$). The adhesive was tested for its properties.

Test Results

| Adhesive composition | Shear adhesion | Peel adhesion 20 min. | Peel adhesion 24 h | SAFT |
|---|---|---|---|---|
| Polymer 1 + 5% resin | 168 h | 11.6 N/mm$^2$ | 14.2 N/mm$^2$ | 154° C. |
| P. 1 + 10% | 57 | 10.9 | 16.6 | 144 |
| P. 2 + 10% resin | >120 | 10.5 | 16.1 | 142 |
| P. 3 + 10% | >120 | 11.2 | 16.7 | 190 |
| P. 4 + 10% | >120 | 10.9 | 17.9 | 200 |
| Polymer 1 | 168 | 8.8 | 13.1 | 200 |
| Polymer 2 | 168 | 10.2 | 13.6 | 153 |
| Polymer 3 | >120 | 12.6 | 9.9 | 200 |
| Polymer 4 | >120 | 12.9 | 15 | 200 |
| P. 3 in Ethylacetate | >120 | | | 195 |

>120 means test were stopped without failure at this time

Gel Permeation Chromatography (GPC)

The number average molecular weight $M_N$ and the polydispersity (PDI) was determined by gel permeation chromatography with PMMA standard. The eluent was THF with 0.1 Vol-% of trifluoroacetic acid.

Shear Adhesion:

Shear adhesion was measured according to Procedure Finat TM04 adapted as follows.

The shear adhesion was measured under a shear load of 1 kg on a 25×25 mm area, applied after wetting out the test panel for 15 min. All testing was performed at 70° C. Time for samples to drop was recorded or when the test was stopped. Typically 168 hours is considered to be very good Peel Adhesion:

Peel adhesion was measured according to Procedure Finat TM02 adapted as follows. Peel adhesion at 180° between the substrate stainless steel and the adhesive film was measured according to Test method adapted as follows.

The peel strength was measured after wetting out a stainless steel panel for 20 minutes and or 24 hours results given in N/25 mm Shear Adhesion Failure Temperature (SAFT):

SAFT adhesion was measured according to Procedure Finat TM05 adapted as follows.

The SAFT measurement was performed by placing a 25×25 mm bonded test specimen in an oven at 40° C. under a shear load of 1 kg (15 min wet out at room temperature before applying the load). The oven temperature was then raised in 0.5° C. increment every 1 min and the temperature at which the bond failed was recorded. If the bond did not fail, the test automatically ended at 200° C. at which time the oven will begin to cool down. At these high temperatures sometimes the backing substrate would fail.

What is claimed is:

1. A block-copolymer containing at least two different blocks wherein block A contains (meth)acrylate monomers and has a glass transition temperature of less than 15° C., block B contains (meth)acrylate monomers and has a glass transition temperature of more than 25° C., which is free from thio-compounds in the polymer chain, one block containing at least one photoinitiator covalently bonded to the chain and block B comprises 4 wt % to 13 wt % tert-butyl (methyl)-acrylate by weight of block-copolymer.

2. A block-copolymer according to claim 1, wherein the photoinitiator contains a benzoylphenoxy-group or an acetophenone group and further contains a (meth)acrylate group.

3. A block-copolymer according to claim 1, wherein 1 to 10 photoinitiator groups are contained per polymer chain.

4. A block-copolymer according to claim 1, wherein the photoinitiator is covalently bonded in block A.

5. A block-copolymer according to claim 1, wherein the block-copolymer has a molecular weight (MN) of 20000 to 300000 g/mol.

6. A block-copolymer according to claim 1, wherein block A comprises 98 to 70 wt.-% of the total molecular weight or comprises 70 to 25 wt-% block A.

7. A block-copolymer according to claim 1, wherein block A and/or block B contains further monomers polymerizable by ATRP, which monomers do not belong to the group of (meth)acrylates and are selected from vinyl ethers, vinyl esters, fumaric acid esters, styrene and its derivatives, and acrylonitrile.

8. A block-copolymer according to claim 1, wherein one block comprises olefinic, epoxy, OH—, COOH—, phosphate-, phosphonate-, and/or sulfonate groups.

9. A block-copolymer according to claim 1, wherein the polymer contains up to five blocks, as an AB, ABA or BAB block polymer.

10. A pressure sensitive adhesive containing at least one polymer according to claim 1, wherein the adhesive is a hot melt adhesive having a viscosity from 10000 mPas to 450000 mPas at 130° C.

11. A pressure sensitive adhesive containing at least one polymer according to claim 1, wherein the adhesive is a solvent borne adhesive having a viscosity from 200 mPas to 5000 mPas at 25° C.

12. A pressure sensitive adhesive according to claim 10, wherein the adhesive further comprises at least one of a tackifier, stabilizer, antioxidant, solvent, plasticizer, or radiation reactive compounds.

13. An article comprising a substrate having a layer of the adhesive of claim 10 thereon, wherein the adhesive is present in an amount of 5 to 50 mg/m2.

14. A pressure sensitive adhesive according to claim 13, wherein the adhesive is crosslinked by electron beam or ultraviolet radiation.

15. The block copolymer of claim 1 manufactured by ATRP.

16. The block copolymer of claim 1 comprising about 8% to about 13% by weight of tert-butyl (methyl)-acrylate.

17. The block copolymer of claim 1 wherein block A comprises ethylhexylacrylate, butylacrylate, methylacrylate and combinations thereof.

18. A block-copolymer containing at least two different blocks wherein block A contains (meth)acrylate monomers and has a glass transition temperature of less than 15° C.; block B is prepared from a mixture of monomers consisting of tert butyl (meth)acrylate and methyl methacrylate and has a glass transition temperature of more than 25° C.; wherein the block-copolymer is free from thio-compounds in the polymer chain and one block contains at least one photoinitiator covalently bonded to the chain.

19. The block-copolymer of claim 18, wherein block A is prepared from a mixture of monomers consisting of ethyhexylacrylate, n-butylacrylate and methacrylate.

20. The block-copolymer of claim 18, wherein block A is prepared from a mixture of monomers consisting of 33 wt % to 37 wt % ethyhexylacrylate, 33 wt % to 37 wt % n-butylacrylate and 12 wt % to 14 wt % methacrylate and block B is prepared from a mixture of monomers consisting of 33 wt % to 37 wt % tert butyl (meth)acrylate and 7 wt % to 9 wt % methyl methacrylate.

* * * * *

UNITED STATES PATENT AND TRADEMARK OFFICE
CERTIFICATE OF CORRECTION

PATENT NO. : 9,670,295 B2
APPLICATION NO. : 13/796771
DATED : June 6, 2017
INVENTOR(S) : Peter D. Palasz et al.

Page 1 of 1

It is certified that error appears in the above-identified patent and that said Letters Patent is hereby corrected as shown below:

In the Claims

Column 10, Line 31: Change "(methyl)-acrylate" to -- (meth)-acrylate --.

Column 10, Line 45: Change "ethy" to -- ethyl --.

Column 10, Line 49: Change "ethyhexylacrylate" to -- ethylhexylacrylate --.

Column 10, Line 53: Change "methacarylate" to -- methacrylate --.

Signed and Sealed this
Thirteenth Day of March, 2018

Andrei Iancu
*Director of the United States Patent and Trademark Office*